US009642115B2

(12) United States Patent
Pan

(10) Patent No.: US 9,642,115 B2
(45) Date of Patent: May 2, 2017

(54) METHOD FOR IMPLEMENTING TRUNK SERVICE BASED ON LONG TERM EVOLUTION AND TRUNK USER TERMINAL

(71) Applicant: ZTE Corporation, Shenzhen (CN)

(72) Inventor: Lei Pan, Shenzhen (CN)

(73) Assignee: ZTE Corporation, Shenzhen (CN)

(*) Notice: Subject to any disclaimer, the term of this patent is extended or adjusted under 35 U.S.C. 154(b) by 13 days.

(21) Appl. No.: 14/647,216

(22) PCT Filed: Aug. 20, 2013

(86) PCT No.: PCT/CN2013/081880
§ 371 (c)(1),
(2) Date: May 26, 2015

(87) PCT Pub. No.: WO2013/189385
PCT Pub. Date: Dec. 27, 2013

(65) Prior Publication Data
US 2015/0319735 A1 Nov. 5, 2015

(30) Foreign Application Priority Data
Nov. 28, 2012 (CN) .......................... 2012 1 0492793

(51) Int. Cl.
*H04W 68/02* (2009.01)
*H04W 28/02* (2009.01)
(Continued)

(52) U.S. Cl.
CPC ......... *H04W 68/02* (2013.01); *H04M 11/022* (2013.01); *H04W 4/06* (2013.01);
(Continued)

(58) Field of Classification Search
CPC ..... H04W 28/0252; H04W 4/06; H04W 4/10; H04W 68/02; H04W 84/022; H04W 88/185
(Continued)

(56) References Cited

U.S. PATENT DOCUMENTS

2006/0234748 A1   10/2006  Baik
2009/0109939 A1*  4/2009   Bhushan ............ H04W 72/082
                                                  370/337
(Continued)

FOREIGN PATENT DOCUMENTS

CN    102083013 A    6/2011
CN    102802127 A    11/2012
CN    102984662 A    3/2013

OTHER PUBLICATIONS

Supplemental European Search Report of EP13807245, dated Sep. 18, 2015.
(Continued)

*Primary Examiner* — Inder Mehra
(74) *Attorney, Agent, or Firm* — Banner & Witcoff, Ltd.

(57) ABSTRACT

A method and trunk user terminal for implementing a trunk service based on LTE is disclosed. The trunk user terminal includes: a first monitoring unit, configured to monitor a trunk paging channel (TPCH); a group call request unit, configured to initiate a group call; a second monitoring unit, configured to: after the first monitoring unit monitors a group call message through the TPCH, monitor a trunk group control channel (TGCCH) on a network side to obtain configuration information of a trunk group traffic channel (TGTCH) issued on the TGCCH; and a third monitoring unit, configured to establish a local TGTCH bearer based on the configuration information to monitor the TGTCH.

12 Claims, 5 Drawing Sheets

(51) Int. Cl.
    *H04W 4/10*      (2009.01)
    *H04M 11/02*     (2006.01)
    *H04W 4/06*      (2009.01)
    H04W 84/02       (2009.01)
    H04W 88/18       (2009.01)

(52) U.S. Cl.
    CPC ......... *H04W 4/10* (2013.01); *H04W 28/0252* (2013.01); *H04W 84/022* (2013.01); *H04W 88/185* (2013.01)

(58) Field of Classification Search
    USPC ...... 455/458, 404.2, 414.1, 456.1, 450, 436, 455/453
    See application file for complete search history.

(56) References Cited

U.S. PATENT DOCUMENTS

2012/0082098 A1    4/2012  Oprescu-Surcobe et al.
2015/0223030 A1*   8/2015  Gu ..................... H04W 72/005
                                                    370/312

OTHER PUBLICATIONS

3GPP TS 43.068 V11.2.0 (Jun. 2012), 3rd Generation Partnership Project; Technical Specification Group Core Network and Terminals; Voice Group Call Service (VGCS); Stage 2, Release 11, 193 pages.

International Search Report of PCT/CN2013/081880, dated Nov. 28, 2013.

* cited by examiner

METHOD FOR IMPLEMENTING TRUNK SERVICE BASED ON LONG TERM EVOLUTION AND TRUNK USER TERMINAL

TECHNICAL FIELD

The present document relates to the field of mobile communication technologies, and in particular, to a method and a trunk user terminal for implementing a trunk service based on Long Term Evolution (LTE).

BACKGROUND

The digital trunk communication system primarily comprises a Terrestrial Trunked Radio (TETRA) system, an Integrated Digital Enhanced Networks (iDEN) system, a Global Open Trunking Architecture (GoTa) system, and a GT800 system, etc. Group call services are most basic services provided by the digital trunk communication system. The group call services allow a trunk user terminal to set up a group call to a certain group of trunk user terminals which belong to a given area. During a call setup using a half duplex mode, the system allocates a group call channel to each cell in the group call area respectively, wherein the uplink is only used by a calling trunk user terminal, and all called trunk user terminals monitor the downlink.

However, in the LTE network, there is currently also a lack of networking policy which can support the requirements of trunk communication, and therefore, a point-to-multipoint half duplex real-time communication operation mode cannot be supported, and the objective use requirements of the existing trunk functions cannot be met. In the exiting LTE system, an Access Stratum (AS) between a User Equipment (UE) and an evolved Node B (eNB) can only implement a point-to-point service. Even for a telephone conference, it also needs to set up dedicated bearer resources for each user, thereby resulting in a waste of resources.

SUMMARY

In order to solve the problem in the related art that the LTE network cannot meet the requirements of trunk communication, the embodiments of the present documents provide a method and a trunk user terminal for implementing a trunk service based on LTE.

In one aspect, the embodiments of the present invention provide a method for implementing a trunk service based on LTE, comprising:

setting up a Trunk Paging CHannel (TPCH);

after a first terminal initiates a group call, a network side correspondingly setting up a Trunk Group Control CHannel (TGCCH) and a Trunk Group Traffic CHannel (TGTCH), and issuing configuration information of the TGTCH through the TGCCH;

a second terminal monitoring a group call message of the first terminal through the TPCH, and monitoring the TGCCH to obtain the configuration information; and the second terminal setting up a local TGTCH bearer based on the configuration information, to monitor the TGTCH;

wherein, the first terminal and the second terminal are trunk user terminals.

In another aspect, the embodiments of the present document provide a trunk user terminal based on LTE, comprising:

a first monitoring unit, configured to monitor a Trunk Paging CHannel (TPCH);

a group call request unit, configured to initiate a group call;

a second monitoring unit, configured to, after the first monitoring unit monitors a group call message through the TPCH, monitor a Trunk Group Control CHannel (TGCCH) on a network side to obtain configuration information of a Trunk Group Traffic CHannel (TGTCH) issued on the TGCCH; and a third monitoring unit, configured to set up a local TGTCH bearer based on the configuration information to monitor the TGTCH.

The trunk user terminal further comprises: a group call response unit, configured to, when the local trunk user terminal is a cell outside a cell where a trunk user terminal which initiates a group call is located, after the first monitoring terminal monitors a group call message through the TPCH, respond to the group call message to obtain a scrambling code, to monitor the TGCCH so as to obtain the configuration information.

Alternatively, when the local trunk user terminal is in a cell where a trunk user terminal which initiates a group call is located, the second monitoring unit obtains a scrambling code when the first monitoring terminal monitors a group call message through the TPCH, to monitor the TGCCH so as to obtain the configuration information.

Alternatively, the second monitoring terminal and the third monitoring unit monitor the TGCCH and the TGTCH respectively based on the same scrambling code.

The scrambling code is a Trunk Radio Network Temporary Identifier (T-rnti).

Alternatively, the trunk user terminal further comprises: a registration processing unit, configured to read trunk system information issued by the network side on a Broadcast Control Channel (BCH), and register the local trunk user terminal with a corresponding cell after reading the trunk system information.

Alternatively, the trunk system information is a System Information Block (sib)19, which includes paging cycle information of the TPCH.

The trunk user terminal calculates the paging cycle of the TPCH with the paging cycle information of the TPCH included in the sib19, and monitors the TPCH with a Trunk Paging Radio Network Temporary Identifier (TP-rnti).

The beneficial effects of the embodiments of the present document are as follows.

The technical schemes of the embodiments of the present document add a logical channel at the trunk UE end and re-divide the functions of the logical channels based on the original LTE system, so as to implement a group call process of a trunk UE to other trunk UEs, implement a trunk service function of a point-to-multipoint call, avoid setup of a plurality of dedicated bearers, save physical resources of an air interface, and at the same time, rapidly respond to the called services, thereby meeting the communication demands of an LTE trunk service.

PREFERRED EMBODIMENTS OF THE PRESENT DOCUMENTS

The present document will be further described in detail below in conjunction with accompanying drawings and embodiments. It should be understood that the specific embodiments described herein are merely used to explain the embodiments of the present document, instead of limiting the embodiments of the present document.

Figure 1:
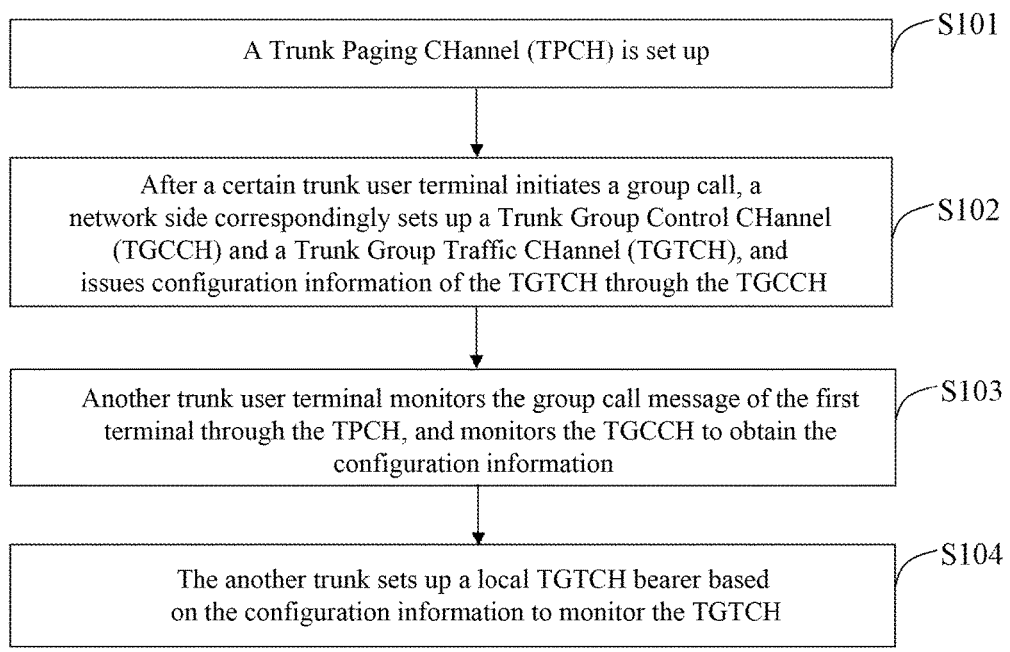
FIG. 1 is a flowchart of a method for implementing a trunk service based on LTE according to an embodiment of the present document.

In order to meet the requirements of an LTE trunk function, the embodiments of the present document add a logical channel at the trunk user terminal UE end and re-divide the functions of the logical channels based on the existing LTE system. FIG. 1 illustrates a flowchart of a method for implementing a trunk service based on LTE according to an embodiment of the present document, which specifically includes the following steps.

In S101, a Trunk Paging CHannel (TPCH) is set up on a trunk user terminal UE side;

in S102, after a certain trunk UE initiates a group call, an LTE network side correspondingly sets up a Trunk Group Control CHannel (TGCCH) and a Trunk Group Traffic CHannel (TGTCH), and issues configuration information of the TGTCH on the TGCCH;

in S103, after another trunk UE monitors the group call message through the TPCH, the TGCCH is monitored to obtain the configuration information of the TGTCH on the TGCCH; and in S104, the trunk UE locally sets up TGTCH bearer resources using the configuration information of the TGTCH, to monitor the TGTCH. At this time, the group call services are completed.

The trunk UE in the above process is any UE in the network which supports trunk services. This scheme can achieve point-to-multipoint group call services of a certain trunk UE to other trunk UEs in an LTE network which supports trunk based on the TPCH, TGTCH, and TGCCH which are newly set up.

A UE which initiates a group call service and a UE which joins in the group call form a group call group. After the group call group is successfully set up, the trunk UE which initiates a group call is a talking user, who can transmit voice data through a Dedicated Traffic Channel (DTCH). Other various trunk UEs in the group can listen to the voice data on the TGTCH which is newly set up, and develop point-to-multipoint trunk communication of the LTE system.

Figure 2:
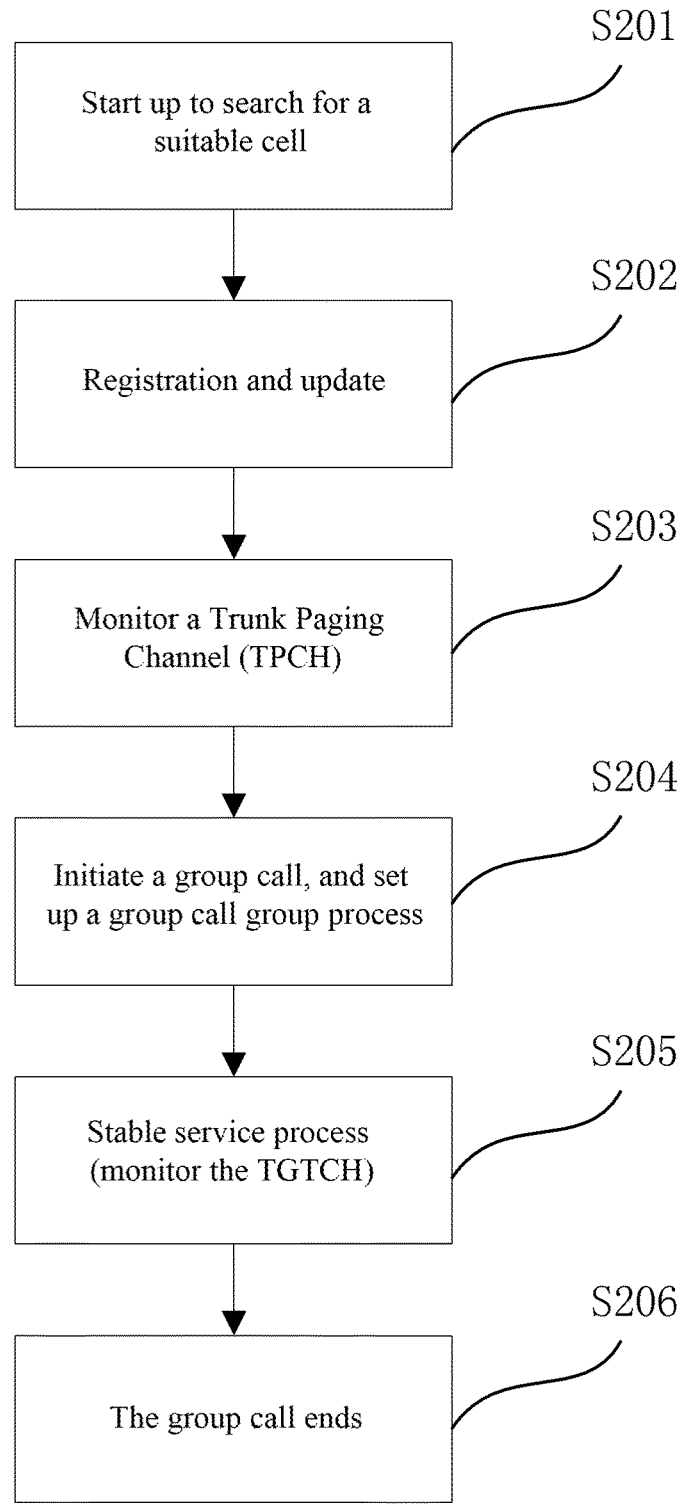
FIG. 2 is a process flow diagram of an embodiment of a method for implementing a trunk service based on LTE according to an embodiment of the present document.

For more clearly introducing the method for implementing a trunk service according to the embodiment of the present document, FIG. 2 provides an embodiment from startup to successful setup of a group call group of a single trunk UE, which specifically comprises the following steps.

In S201, the trunk UE is started to search for a suitable cell, firstly reads the BCH, and receives trunk related system information, wherein the scheduling information sib19 of the trunk system is received on the BCCH of the BCH.

In S202, as the sib19 is received, it is determined that the cell is a cell which supports trunk, wherein the trunk UE is registered with the cell, and the channel mapping relationship of the existing AS layer may be used to complete the registration.

In S203, after the trunk UE resides in the cell, the paging cycle of the trunk TPCH is calculated according to the group ID information in the sib19, and then the TP-rnti is used as a scrambling code of a public paging channel, to monitor the TPCH paging channel.

At this point, the trunk UE may monitor the group call message (if any) on the TPCH, or may initiate a group call by itself, to request for setting up a group call group. The latter case will be described in the present embodiment.

In S204, the trunk UE initiates a group call, to transmit a link setup request to a network side. The core network pages for the trunk user on the whole network according to the request. A trunk UE in the same cell monitors the paging on the TPCH, and may directly obtain a scrambling code T-rnti from the paging message. After a trunk UE in a different cell monitors the paging on the TPCH, judgment is performed on the group. If it is found that the group is a group to which the local UE belongs, the upper layer is notified to rely with a paging response and configure the scrambling code T-rnti in the paging to the physical layer.

On the other hand, when the network side receives the request for paging on the whole network, the eNB sets up a TGTCH channel, transmits the configuration information of the TGTCH on the TGCCH channel, and broadcasts it to the trunk UE. A trunk UE in the same cell may monitor the TGCCH using the scrambling code T-rnti which is directly obtained in the paging message, so as to obtain the configuration information of the TGTCH; and a trunk UE in a different cell may obtain the scrambling code after replying with a paging response, and the physical layer thereof may monitor the TGCCH according to the scrambling code, to obtain the configuration information of the TGTCH.

Various UEs which obtain the configuration information of the TGTCH locally set up local bearer resources of the TGTCH, to monitor the service data on the TGTCH.

In S205, various UEs start to monitor the service data on the TGTCH, so as to enter a stable service state and develop point-to-multipoint data transmission. Scrambling codes for monitoring the TGTCH and the TGCCH are the same scrambling code.

In S206, when the group call ends, signaling is transmitted to the core network, which notifies the eNB to release trunk resources and release Radio Resource Control (RRC) protocol connection (the RRC is a third layer information for processing a control plane between the UE and the eNodeB) to enable the UE to return to an idle state.

In another embodiment, in the registration process of the trunk UE in S202, a Non Access Stratum (NAS) process may be implemented. Specifically, an update step of the group where the trunk UE is located is added in the registration process, to ensure the accuracy of the trunk UE receiving the information.

Figure 3:
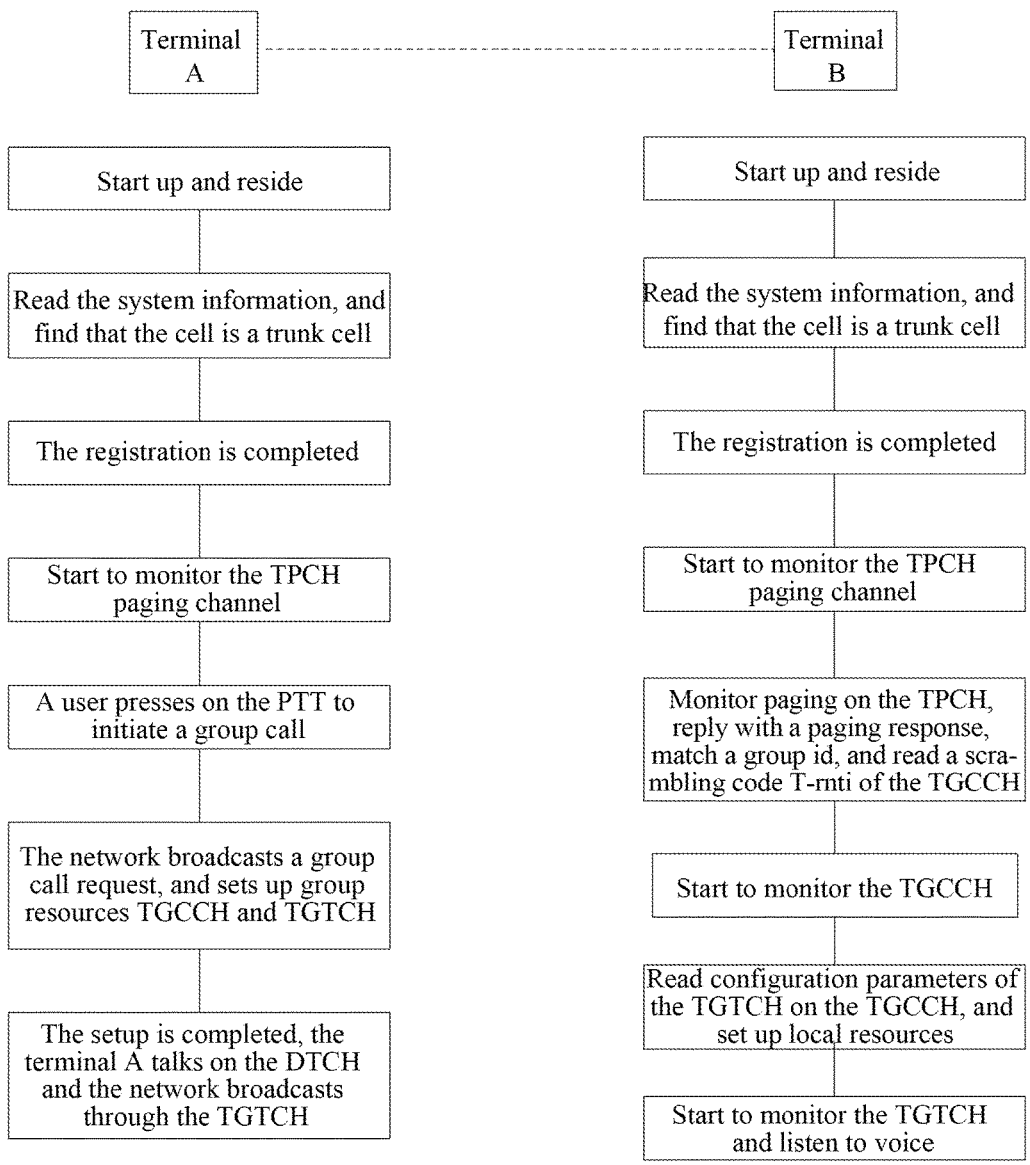
FIG. 3 is a process flow diagram of another embodiment of a method for implementing a trunk service based on LTE according to an embodiment of the present document.

In the flowchart illustrated in FIG. 3, an embodiment of the present document is described by taking a trunk user terminal A initiating a group call and another trunk user terminal B receiving the call and joining in a group call group as an example.

After terminal A and terminal B are started and complete registration respectively, the terminal A and terminal B monitor the TPCH;

the terminal A presses on a key of Push To Talk (PTT) software, to initiate a group call;

the network side responds to the call request thereof, and broadcasts the paging on the TPCHs of various cells. The eNB starts to set up resources of the TGTCH at the cells which have received the response of the Paging, and transmits the configuration information of the TGTCH on the TGCCH channel.

The terminal B responds to the paging, and descrambles the signaling of the TGCCH according to the scrambling code T-rnti of the TGCCH obtained from the TPCH, so as to obtain the configuration information of the TGTCH, and then set up the resources of the local TGTCH;

the whole call flow ends.

In the subsequent trunk communication process, the terminal A, i.e., the talking user, transmits voice data on the DTCH which is set up by the network side for the terminal A, wherein the data may be scrambled using C-rnti. The terminal B, i.e., the listening user, descrambles and listens to the voice data of the terminal A using the T-rnti on the local TGTCH which is set up by the terminal B. Here, there is at least one terminal B. In the description of the embodiment of FIG. 3, the terminal B and the terminal A are not in the same cell. When there are multiple other terminals which make the same response as the terminal B, the resources of the TGTCH may be set up locally and the voice data of the terminal A may be listened. In addition, if a terminal C located in a cell of the terminal A belongs to trunk of the terminal A, the terminal C monitors the paging, may directly obtain the scrambling code T-rnti for subsequent steps of setting up resources of the local TGTCH, and forms a group call group together with the terminal B etc. to develop trunk service. Thus, with the embodiments of the present document, point-to-multipoint trunk services of the LTE system are achieved.

Figure 4:
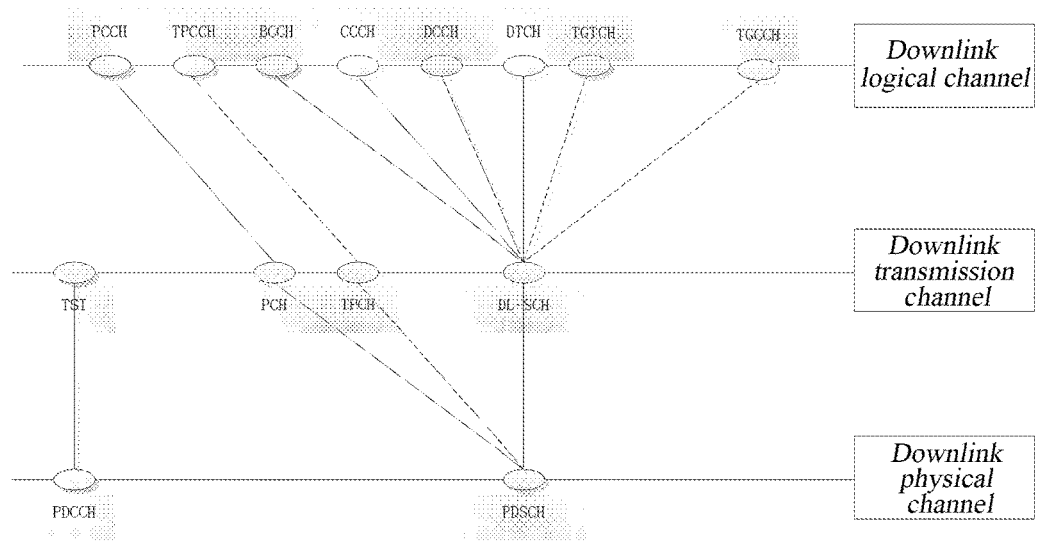
FIG. 4 is a diagram of a channel mapping relationship on a trunk user terminal side according to an embodiment of the present document.

FIG. 4 is a diagram of a channel mapping relationship on a trunk UE side according to an embodiment of the present document. Wherein, the TPCH, the TGTCH and the TGCCH are logical channels which are newly set up, the TPCH channel is mapped to a Physical Downlink Shared Channel (PDSCH), the TGTCH and the TGCCH are mapped to a Downlink Shared channel (DL-SCH), and a mapping relationship for the TPCH is TPCCH-TPCH-PDSCH.

Wherein, the mapping from the TPCH to the TPCCH is for convenience of reading the paging information of other trunk UEs after the trunk UE is started and registered. The network side periodically broadcasts the physical resources of all trunk groups on the newly added TPCH, and the trunk UE initiates a group call through the CCCH.

Wherein, the DTCH is mapped to the UL-SCH in the uplink direction, which is used for signaling transmission and voice transmission of a trunk talking user respectively.

Wherein, the TGCCH is mapped to the DL-SCH in the downlink direction, and is configured for reception of signaling of the trunk talking user and the trunk listening user. The TGTCH is mapped to the DL-SCH in the downlink direction, and is configured for reception of voice data of all trunk listening users.

Wherein, the mapping relationship from the BCCH of the BCH to the DL-SCH is unchanged, but the scheduling information of the MIB blocks on the BCCH is different from that in the original protocol. In the embodiment of the present document, the trunk system information is newly added in the scheduling information. This is because that after a UE is started, the UE is to read the BCH to search for a suitable cell, while for the trunk system, the UE is to receive the trunk system information. For this purpose, the scheduling information sib19 of the trunk system is added in the Management Information Blok (MIB) on the BCCH. Then, the UE may receive the trunk related system information on the BCH, so as to determine that the cell where it is located is a cell which supports trunk. Correspondingly, transmission of a System Information Block (SIB) block of the trunk should be added on the LTE network side.

After the terminal is started, the terminal reads the BCH of the cell. If the SIB block is received, the terminal reads the scheduling information sib19 of the trunk system, and then determines that the cell is a cell which supports trunk, performs registration, and accesses the cell. If the sib19 is not read, it is considered that the cell is a common public network cell, and the trunk services cannot be implemented. In addition, sib20 is further added in sib19, which indicates whether the cell supports concurrence of the trunk dedicated network and LTE public network. If sib20 indicates support, the terminal registers with the trunk network and the LTE network at the same time during registration. This terminal is a dual-network terminal. The additional function of the dual-network terminal will not influence various steps implemented by the present embodiment for the trunk dedicated network. Other mapping relationships and functions in FIG. 4 are well known in the art. The uplink mapping relationship is the same as that in the related art, and will not be described here in detail.

Figure 5:
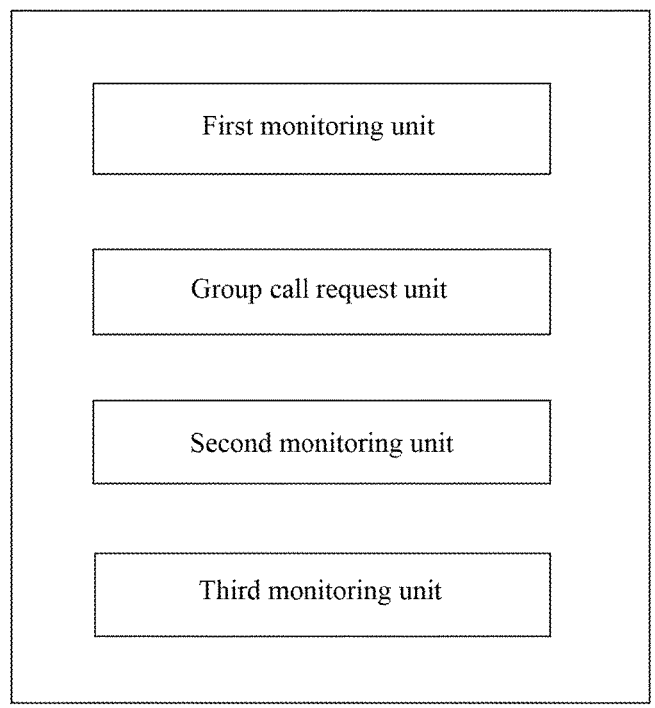
FIG. 5 is a structural diagram of an embodiment of a trunk user terminal according to an embodiment of the present document.

Correspondingly, FIG. 5 illustrates a structural diagram of a trunk user terminal according to an embodiment of the present document, comprising:

a first monitoring unit, configured to monitor a TPCH;

a group call request unit, configured to initiate a group call;

a second monitoring unit, configured to, after the first monitoring unit monitors a group call message through the TPCH, monitor a TGCCH on a network side to obtain configuration information of a TGTCH issued on the TGCCH; and a third monitoring unit, configured to set up a local TGTCH bearer based on the configuration information of the TGTCH to monitor the TGTCH.

It can be known from the trunk user terminal in FIG. 5 that the terminal not only has a group call request unit which initiates a group call, but also has a monitoring unit which monitors a group call message of other terminals, and may be handed over between a talking user and a listening user according to the requirements of the applications, to complete the group call process according to the embodiment in FIG. 4 together with other trunk user terminals in the group and develop a point-to-multipoint trunk service operation.

Figure 6:
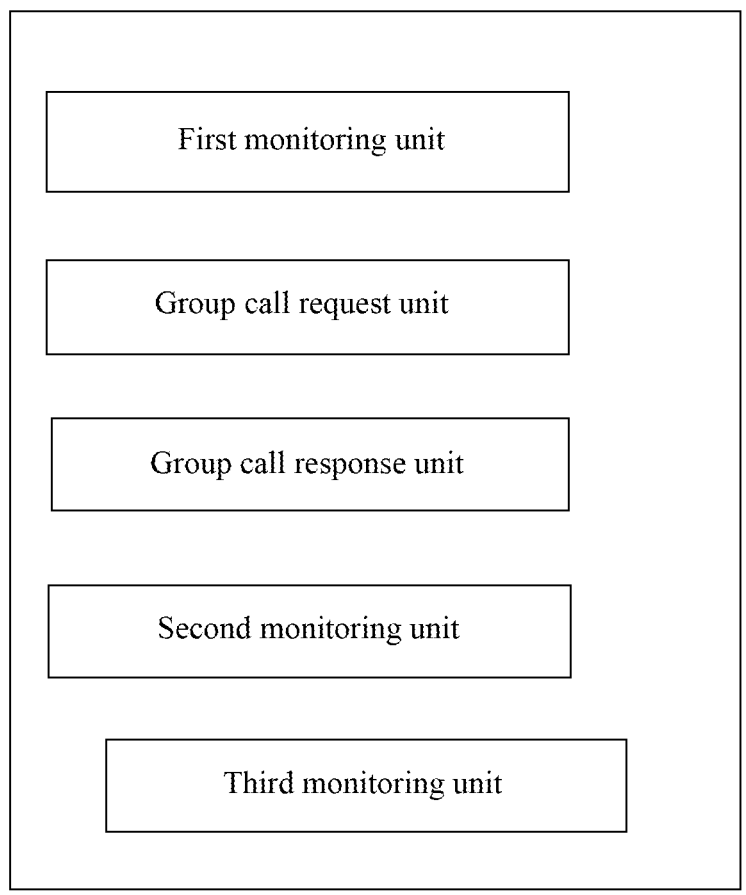
FIG. 6 is a structural diagram of another embodiment of a trunk user terminal according to an embodiment of the present document.

The trunk user terminal may further comprise a group call response unit. As shown in FIG. 6, when the local trunk user terminal and a trunk user terminal which initiates a group call are not in the same cell, after the first monitoring unit monitors a group call message, the group call response unit responds to the group call message to obtain a corresponding scrambling code, so as to monitor the TGCCH, thereby obtaining the configuration information of the TGTCH to set up local resources.

If the local trunk user terminal is in the same cell as that of the trunk user terminal which initiates a group call, the group call response unit needs not to respond to the group call message, and the first monitoring unit can directly obtain a corresponding scrambling code in the monitored group call message, to implement subsequent steps. When in use, if the local terminal is a talking user who initiates a group call, voice data may be transmitted on the DTCH which is set up on the network side, and other listening users listen to the voice information on the local TGTCH, to develop the trunk service operation of the LTE system.

The trunk user terminal further comprises a registration processing unit, configured to read a BCH of a cell after the terminal is started, and receive the trunk related system information, and if the scheduling information sib19 of the trunk system is read on the BCH, determine that the cell is a cell which supports the trunk, perform registration, and access the cell. If there is no sib19, it is considered that the cell is a common public network cell, the trunk services cannot be implemented, and the registration process is not performed.

After the registration, the first monitoring unit may calculate the receiving period and time of the TPCH using the group ID information included in the received sib19, and monitor the TPCH with the scrambling code TP-rnti.

Although the preferable embodiments of the present document have been disclosed for purpose of illustration, those skilled in art will realize that various improvements, addition, and substitutions are possible. Therefore, the scope of the embodiments of the present document should not be limited to the above embodiments.

INDUSTRIAL APPLICABILITY

The technical schemes of the embodiments of the present document add a logical channel at the trunk UE end and re-divide the functions of the logical channels based on the original LTE system, so as to implement a group call process of a trunk UE to other trunk UEs, implement a trunk service function of a point-to-multipoint call, avoid setup of a plurality of dedicated bearers, save physical resources of an air interface, and at the same time, rapidly respond to the called services, thereby meeting the communication demands of an LTE trunk service.

What is claimed is:

1. A method for implementing a trunk service based on Long Term Evolution (LTE), comprising:
   setting up a Trunk Paging CHannel (TPCH);
   after a first terminal initiates a group call, a network side correspondingly setting up a Trunk Group Control CHannel (TGCCH) and a Trunk Group Traffic CHannel (TGTCH), and issuing configuration information of the TGTCH through the TGCCH;
   a second terminal monitoring and finding a group call message of the first terminal through the TPCH, and monitoring the TGCCH to obtain the configuration information; and
   the second terminal setting up a local TGTCH bearer based on the configuration information to monitor the TGTCH;
   wherein, the first terminal and the second terminal are trunk user terminals;
   wherein, the second terminal is in a cell where the first terminal is located, and the second terminal obtains a scrambling code when the second terminal monitors and finding the group call message of the first terminal through the TPCH, to monitor the TGCCH so as to obtain the configuration information;
   or,
   the second terminal is in a cell outside a cell where the first terminal is located, and after the second terminal monitors and finds the group call message of the first terminal through the TPCH, the second terminal responds to the group call message to obtain a scrambling code, so as to monitor the TGCCH to obtain the configuration information.

2. The method for implementing a trunk service based on LTE according to claim 1, wherein, the second terminal monitors the TGCCH and the TGTCH based on the same scrambling code.

3. The method for implementing a trunk service based on LTE according to claim 2, wherein, the scrambling code is a Trunk Radio Network Temporary Identifier (T-rnti).

4. The method for implementing a trunk service based on LTE according to claim 1, wherein, the network side issues trunk system information on a Broadcast Control Channel (BCH), and after a trunk user terminal reads the trunk system information, the trunk user terminal registers with a corresponding cell.

5. The method for implementing a trunk service based on LTE according to claim 4, wherein, the trunk system information is a System Information Block (sib)19, which includes paging cycle information of the TPCH.

6. The method for implementing a trunk service based on LTE according to claim 5, wherein, the trunk user terminal calculates the paging cycle of the TPCH with the paging cycle information of the TPCH included in the sib19, and monitors the TPCH with a Trunk Paging Radio Network Temporary Identifier (TP-rnti).

7. A trunk user terminal based on Long Term Evolution (LTE), comprising:
   a first monitoring unit, configured to monitor a Trunk Paging CHannel (TPCH);
   a group call request unit, configured to initiate a group call;
   a second monitoring unit, configured to, after the first monitoring unit monitors and finds a group call message through the TPCH, monitor a Trunk Group Control CHannel (TGCCH) on a network side to obtain configuration information of a Trunk Group Traffic CHannel (TGTCH) issued on the TGCCH; and
   a third monitoring unit, configured to set up a local TGTCH bearer based on the configuration information to monitor the TGTCH;
   wherein, when the local trunk user terminal is in a cell where a trunk user terminal which initiates a group call is located, the second monitoring unit obtains a scrambling code when the first monitoring unit monitors and finds the group call message through the TPCH, so as to monitor the TGCCH to obtain the configuration information;
   or, the trunk user terminal further comprising: a group call response unit, configured to, when a local trunk user terminal is in a cell outside a cell where a trunk user terminal which initiates a group call is located, after the first monitoring unit monitors and finds the group call message through the TPCH, respond to the group call message to obtain a scrambling code, so as to monitor the TGCCH to obtain the configuration information.

8. The trunk user terminal according to claim 7, wherein, the second monitoring unit and the third monitoring unit monitor the TGCCH and the TGTCH respectively based on a same scrambling code.

9. The trunk user terminal according to claim 8, wherein, the scrambling code is a Trunk Radio Network Temporary Identifier (T-rnti).

10. The trunk user terminal according to claim 7, further comprising: a registration processing unit, configured to read trunk system information issued by a network side on a Broadcast Control Channel (BCH), and register the local trunk user terminal with a corresponding cell after reading the trunk system information.

11. The trunk user terminal according to claim 10, wherein, the trunk system information is a System Information Block (sib)19, which includes paging cycle information of the TPCH.

12. The trunk user terminal according to claim 11, wherein, the trunk user terminal calculates a paging cycle of the TPCH with the paging cycle information of the TPCH included in the sib19, and monitors the TPCH with a Trunk Paging Radio Network Temporary Identifier (TP-rnti).

* * * * *